United States Patent
Zhao et al.

(10) Patent No.: US 10,616,841 B2
(45) Date of Patent: *Apr. 7, 2020

(54) METHOD AND APPARATUS FOR TRANSMITTING D2D SYNCHRONIZATION SIGNALS

(71) Applicant: Telefonaktiebolaget LM Ericsson (publ), Stockholm (SE)

(72) Inventors: Zhenshan Zhao, Beijing (CN); Qianxi Lu, Beijing (CN); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

This patent is subject to a terminal disclaimer.

(21) Appl. No.: 15/949,599

(22) Filed: Apr. 10, 2018

(65) Prior Publication Data

US 2018/0295592 A1 Oct. 11, 2018

Related U.S. Application Data (63) Continuation of application No. 15/113,695, filed as application No. PCT/CN2015/070587 on Jan. 13, 2015, now Pat. No. 9,967,844.

(30) Foreign Application Priority Data

Jan. 24, 2014 (WO) ................ PCT/CN2014/071409

(51) Int. Cl.
*H04W 56/00* (2009.01)
*H04L 5/14* (2006.01)
*H04J 11/00* (2006.01)

(52) U.S. Cl.
CPC ............. *H04W 56/001* (2013.01); *H04L 5/14* (2013.01)

(58) Field of Classification Search
None
See application file for complete search history.

(56) References Cited

U.S. PATENT DOCUMENTS 9,603,113 B2 3/2017 Abedini et al.
2007/0242669 A1 10/2007 Achard et al.
(Continued)

FOREIGN PATENT DOCUMENTS

CN 103428818 A 12/2013

OTHER PUBLICATIONS

Unknown, Author, "On the D2DSS and PD2DSCH", 3GPP TSG-RAN1 Meeting #75, R1-135277, ETRI, San =Francisco, USA, Nov. 11-15, 2013, 7 pages.
(Continued)

*Primary Examiner* — Hong S Cho
(74) *Attorney, Agent, or Firm* — Murphy, Bilak & Homiller, PLLC (57) ABSTRACT

Embodiments of the disclosure provide a method, an apparatus, a network node, and a computer program product for transmitting D2D synchronization signals. According to the method, D2D synchronization signals are received from a first network node. A hop number of the D2D synchronization signals is determined based on radio resources of the D2D synchronization signals. Whether to transmit the D2D synchronization signals to a second network node is determined based on the hop number.

13 Claims, 6 Drawing Sheets

(56) References Cited

U.S. PATENT DOCUMENTS

| | | |
|---|---|---|
| 2008/0165761 A1 | 7/2008 | Goppner et al. |
| 2013/0185373 A1 | 7/2013 | Vandwalle et al. |
| 2015/0264588 A1 | 9/2015 | Li et al. |
| 2016/0212594 A1* | 7/2016 | Morita .................. H04W 72/10 |
| 2016/0227495 A1 | 8/2016 | Lee et al. |
| 2016/0227496 A1 | 8/2016 | Panteleev et al. |

OTHER PUBLICATIONS

Unknown, Author, "Synchronization Signals and Channel Design for D2D Discovery and Communication", 3GPP TSG RAN WG1 Meeting #75, R1-135903, Ericsson, San Francisco, USA, Nov. 11-15, 2013, 10 pages.

Unknown, Author, "Discussion on D2D Synchronization", 3GPP TSG RAN WG1 Meeting #75, R1-135113, Intel Corporation, San Francisco, CA, Nov. 11-15, 2013, 1-7.

Unknown, Author, "Multi-hop D2D synchronization performance", 3GPP TSG-RAN WG1 #75, R1-135316, Qualcomm Incorporated, San Francisco, CA, Nov. 11-15, 2013, 1-7.

Unknown, Author, "Preliminary performance analysis of D2D synchronization", 3GPP TSG RAN WG1 Meeting #75, R1-135114, Intel Corporation, San Francisco, CA, Nov. 11-15, 2013, 1-8.

Unknown, Author, "Synchronization Procedures for D2D Discovery and Communication", 3GPP TSG RAN WG1 Meeting #74bis, R1-134720, Ericsson, Guangzhou, China, Oct. 7-11, 2013, 1-6.

\* cited by examiner

METHOD AND APPARATUS FOR TRANSMITTING D2D SYNCHRONIZATION SIGNALS

RELATED APPLICATIONS

This application is a continuation of U.S. application Ser. No. 15/113,695, filed 22 Jul. 2016, which is a U.S. National Phase Application of PCT/CN2015/070587, filed 13 Jan. 2015, which claims foreign priority to PCT/CN2014/071409, filed 24 Jan. 2014.

TECHNICAL FIELD

Embodiments of the present invention generally relate to communication techniques. More particularly, embodiments of the present invention relate to a method and an apparatus, a network node and a computer program product for transmitting device-to-device (D2D) synchronization signals.

BACKGROUND

The background description provided herein is for generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

D2D communication is a well-known and widely used component of many existing wireless technologies, including ad hoc and cellular networks. Examples include Bluetooth and several variants of the IEEE 802.11 standards suite such as WIFI Direct. These systems operate in unlicensed spectrum.

Recently, D2D communications as an underlay to cellular networks have been proposed to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and (dynamic) sharing between the device-to-device services and cellular services is more flexible and provides higher spectrum efficiency.

The ProSe Study Item recommends also support D2D operation between out of NW coverage user equipments (UEs) and between in-coverage and out-of-coverage UEs. In such a case, certain UEs may regularly transmit synchronization signals (for example, Device to device Synchronization Signal (D2DSS)) and provide local synchronization to their neighbor UEs. The ProSe Study Item recommends also support for inter-cell D2D scenarios where UEs camping on possibly unsynchronized cells are able to synchronize to each other.

Figure 1:
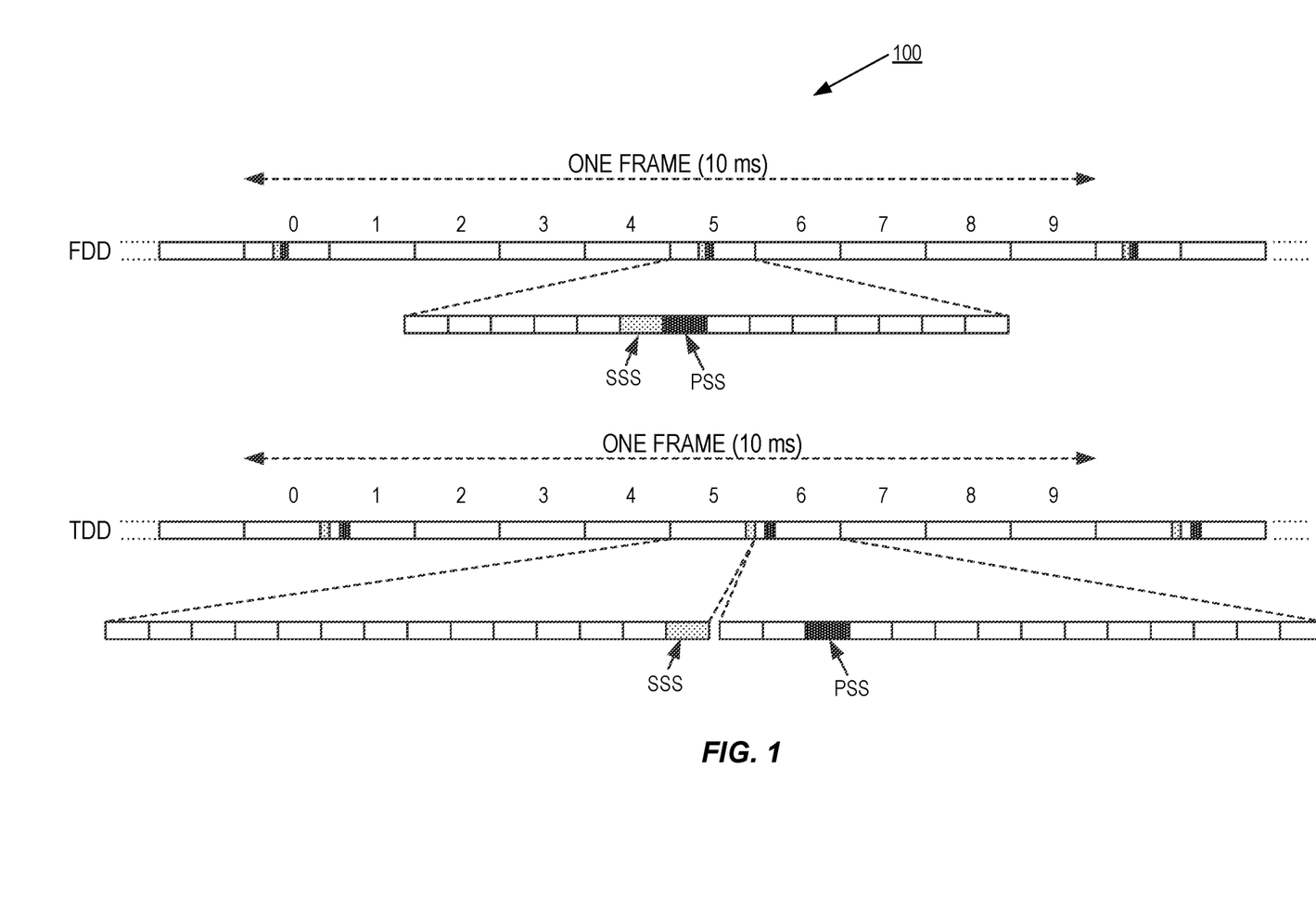
FIG. 1 illustrates a schematic diagram of PSS and SSS time positions in case of FDD and TDD.
Figure 2:
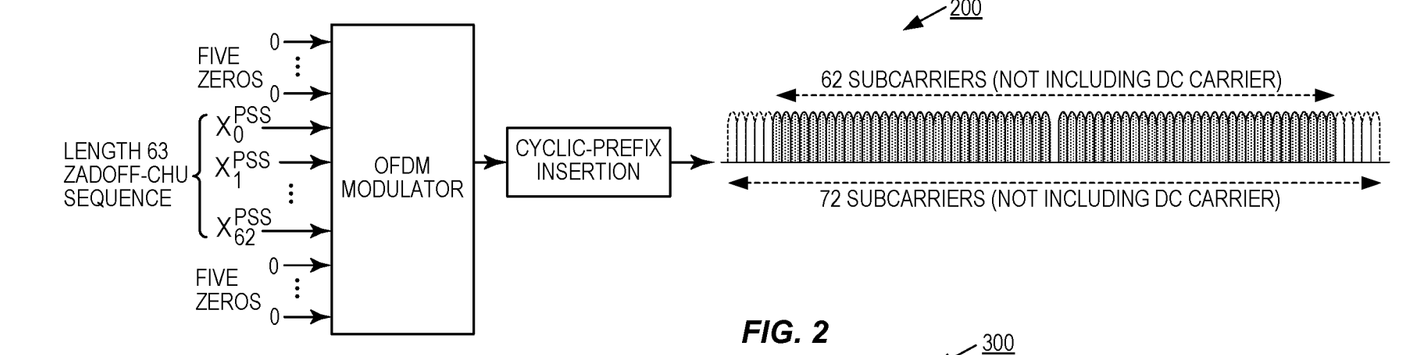
FIG. 2 illustrates a schematic diagram of PSS generation and structure.
Figure 3:
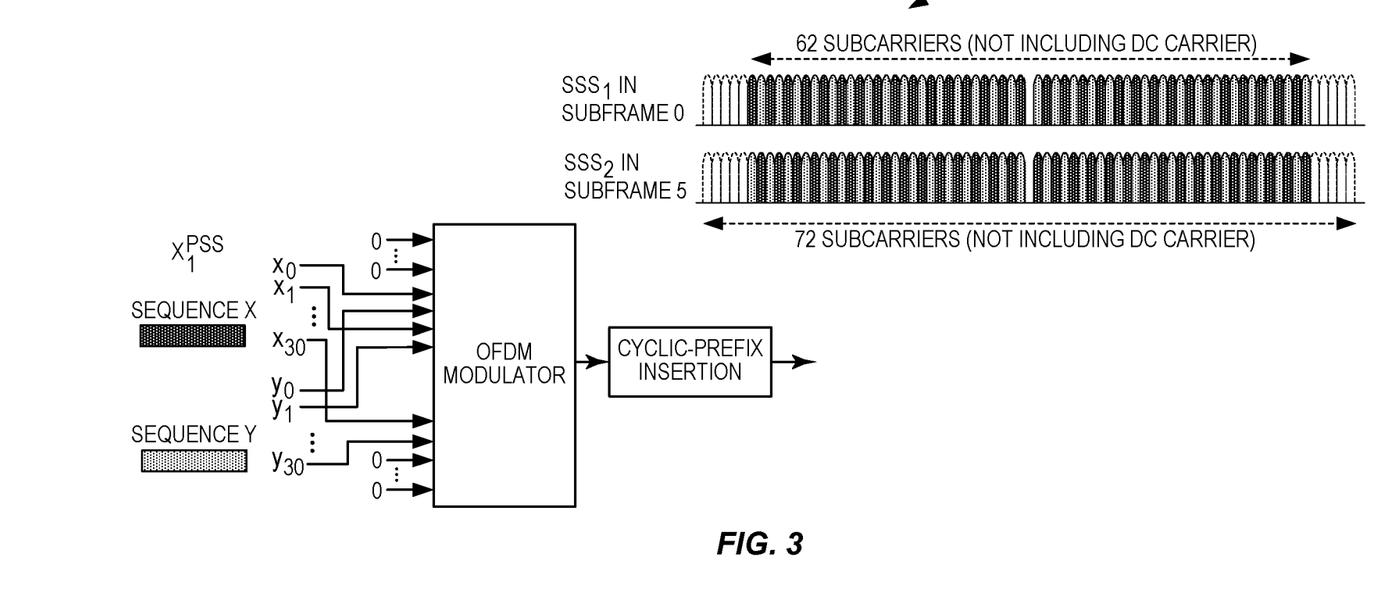
FIG. 3 illustrates a schematic diagram of SSS generation and structure.

It is also agreed in 3GPP in the ProSe SI in Long Term Evolution (LTE) that D2D capable UEs will operate D2D within the UL spectrum (for Frequency Division Duplexing (FDD) spectrum) and UL subframes (for Time Division Duplexing (TDD) spectrum). Therefore, D2D UEs are not expected to transmit sync signals in DL spectrum, differently from eNBs.

eNBs provide synchronization by periodically transmitting sync signals (for example, Primary Sync signal (PSS)/Secondary Sync signal (SSS)). Such signals are also intended for cell search operation and for acquiring initial synchronization. PSS/SSS are generated based on pre-defined sequences with good correlation properties, to limit inter-cell interference, minimize cell identification errors and obtain reliable synchronization. In total, 504 combinations of PSS/SSS sequences are defined in LTE and are mapped to as many cell IDs. UEs that successfully detect and identify a sync signal are thus able to identify the corresponding cell-ID, too. FIG. 1 illustrates PSS and SSS time positions in case of FDD and TDD, and FIGS. 2 and 3 illustrate generation and structure of PSS and SSS.

D2D requires UEs to be able to synchronize to each other directly to support direct communication. It has been discussed in 3GPP that the legacy LTE sequences may be considered for sync signals (D2DSS) transmitted by UEs:

Working Assumption:
Synchronization sources transmit at least a D2DSS: D2D Synchronization Signal
May be used by D2D UEs at least to derive time/frequency
May (FFS) also carry the identity and/or type of the synchronization source(s)
Comprises at least a PD2DSS
PD2DSS is a ZC sequence
Length FFS
May also comprise a SD2DSS
SD2DSS is an M sequence
Length FFS Even though a range of different distributed synchronization protocols are possible, one option that is being considered in 3GPP is based on hierarchical synchronization with the possibility of multihop sync-relay. In short, some nodes adopt the role of synchronization masters (sometimes referred to as SH, Synchronization head, or CH, Cluster Head) according to a distributed synchronization algorithm. If the synchronization master is a UE, it provides synchronization by transmitting D2DSS and/or PD2DSCH (Physical Device to Device Synchronization Channel). If the synchronization master is an eNB it provides synchronization by PSS/SSS and broadcast control information by, e.g., MIB/SIB signaling. The synchronization master is a special case of synchronization source that acts as an independent synchronization source, i.e., it does not inherit synchronization from other nodes by use of the radio interface.

UEs that are under coverage of a synchronization source may, according to predefined rules, transmit D2DSS and/or PD2DSCH themselves, according to the synchronization reference received from their synchronization source. They may also transmit at least parts of the control information received from the synchronization master by use of D2DSS and/or PD2DSCH. Such mode of operation is here termed as sync-relay or control plane (CP)-relay.

To limit error propagation and limit dependency on a single failure point, it has been proposed to limit the number of CP-relay hops to a predefined number. The hop numbers are counted from the synchronization master.

There are several issues associated with multihop synchronization. For example, the receiver needs to assess the hop number associated to a certain synchronization signal because the hop number contributes to the distributed synchronization protocol (e.g., sync sources with low hop-number are preferred as synchronization references). However, if D2DSS is generated according to the 3GPP working assumption, it is impossible for the receiver to identify the associated hop number. In addition, considering that a given CP-relay UE may be only aware of D2DSS/PD2DSCH associated with some but not all the supported hop numbers, interference towards other D2DSS not detected by the UE may be generated.

In view of the foregoing problems, it would be desirable to identify the associated hop number, to efficiently transmit the D2D synchronization signals.

SUMMARY

To address or mitigate at least one of the above potential problems, embodiments of the present invention would propose to identify the associated hop number, to efficiently transmit the D2D synchronization signals.

According to a first aspect of the present invention, embodiments of the invention provide a method for transmitting D2D synchronization signals. According to the method, D2D synchronization signals are received from a first network node. A hop number of the D2D synchronization signals is determined based on radio resources of the D2D synchronization signals. Whether to transmit the D2D synchronization signals to a second network node is determined based on the hop number.

According to a second aspect of the present invention, embodiments of the invention provide an apparatus for transmitting D2D synchronization signals. The apparatus comprises a receiving unit, a first determining unit and a second determining unit. The receiving unit is configured to receive D2D synchronization signals from a first network node. The first determining unit is configured to determine a hop number of the D2D synchronization signals based on radio resources of the D2D synchronization signals. The second determining unit is configured to determine whether to transmit the D2D synchronization signals to a second network node based on the hop number.

According to a third aspect of the present invention, embodiments of the invention provide a network node for transmitting D2D synchronization signals comprising an apparatus according to embodiments according to the second aspect of the present invention.

According to a fourth aspect of the present invention, embodiments of the invention provide a computer program product. The computer program product comprises at least one computer readable storage medium having a computer readable program code portion stored thereon, and the computer readable program code portion may comprise program code instructions for performing methods according to embodiments of the present invention.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

The embodiments of the present invention that are presented in the sense of examples and their advantages are explained in greater detail below with reference to the accompanying drawings, in which.

Throughout the figures, same or similar reference numbers indicate same or similar elements.

DETAILED DESCRIPTION

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention may be applied in various wireless networks, including but not limited to a Long Term Evolution (LTE) network. Given the rapid development in communications, there will of course also be future type wireless communication technologies and systems with which the present invention may be embodied. It should not be seen as limiting the scope of the invention to only the aforementioned system.

In the context of the disclosure, the term "user equipment" or "UE" may refer to a terminal, a Mobile Terminal (MT), a Subscriber Station (SS), a Portable Subscriber Station (PSS), Mobile Station (MS), or an Access Terminal (AT), and so on. The UE may include some or all the functions of the UE, the terminal, the MT, the SS, the PSS, the MS, or the AT.

The term "network node" may refer to, but not limited to, for example, a UE, a D2D transmitter, a D2D receiver, and so on.

Embodiments of the present invention provide a method for transmitting D2D synchronization signals. According to embodiments of the present invention, the D2DSS and/or PD2DSCH resources are mapped associated to different hop numbers to the subframe in a mutually orthogonal fashion, such that inter-D2DSS/PD2DSCH interference is mitigated or prevented.

According to further embodiments of the present invention, the D2DSS/PD2DSCH signals the associated hop number. The relative mapping of D2DSS/PD2DSCH resources associated to different hop numbers may be pre-defined. According to still further embodiments of the present invention, UEs may avoid transmitting over resources reserved for any of the supported hop numbers. According to optional embodiments of the present invention, the network (NW) has the possibility to configure the maximum number of supported hops and avoid reserving unnecessarily many resources for sync transmission. The network may refer to the base station (BS) side. The term "base station" or "BS" may refer to a node B (NodeB), an evolved NodeB (eNodeB), a Base Transceiver Station (BTS), an Access Point (AP), a Radio Access Station (RAS), or a Mobile Multihop Relay (MMR)-BS, and some or all of the functions of the BS, the NodeB, the eNodeB, the BTS, the AP, the RAS, or the MMR-BS may be included.

Now some exemplary embodiments of the present invention will be described below with reference to the figures.

Figure 4:
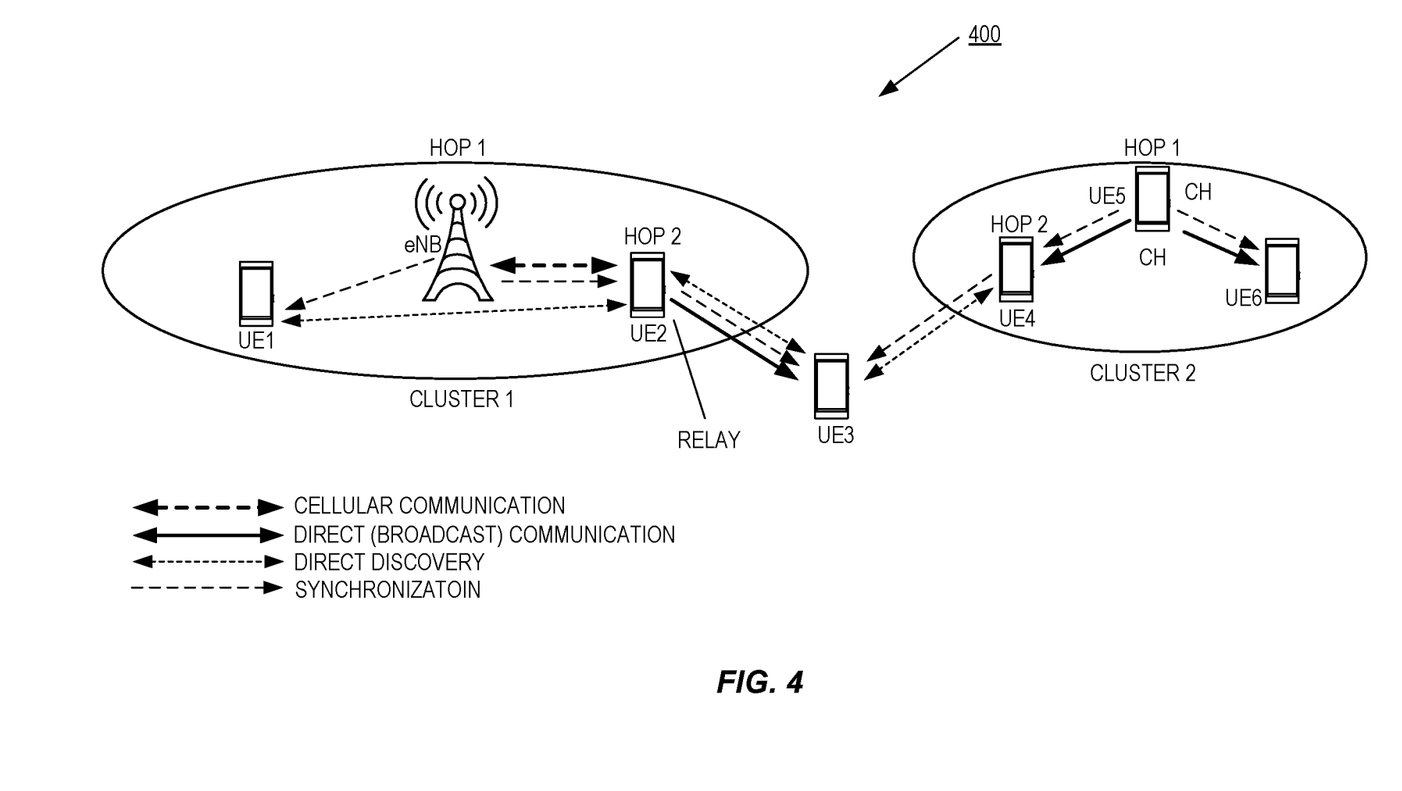
FIG. 4 illustrates a schematic diagram of a 2-hop system.

Reference is first made to FIG. 4, which illustrates a schematic diagram of a 2-hop system. As is shown in FIG. 4, in the left cell, the eNB transmits synchronization signals to UE2, which is referred to as Hop 1. Then, UE2 transmits to UE3 D2D synchronization signals in Hop 2. Thus, there are two hops in the left cell. The right cell likewise has two hops. For example, UE5 transmits to UE4 D2D synchronization signals in Hop 1, and the UE4 transmits to UE3 D2D synchronization signals in Hop 2.

Each D2DSS/PD2DSCH signal is associated to a certain (sync) hop number. We also define a "synchronization reference" as a time and/or frequency reference associated to a certain synchronization signal. For example, a relayed synchronization signal is associated to the same synchronization reference as the sync signal in the first hop.

Figure 5:
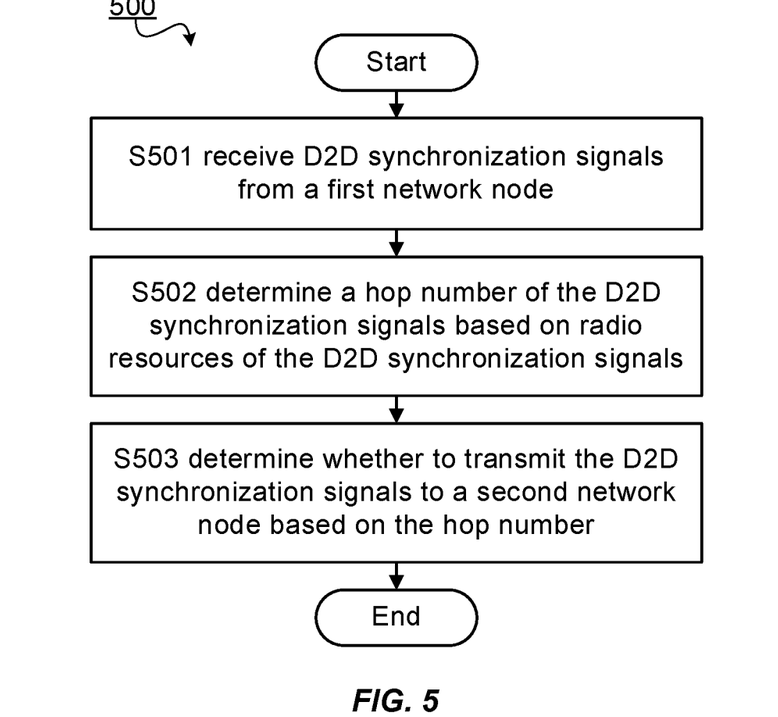
FIG. 5 illustrates a flow chart of a method 500 for transmitting D2D synchronization signals according to embodiments of the invention.

Reference is now made to FIG. 5, which illustrates a flow chart of a method 500 for transmitting D2D synchronization signals according to embodiments of the invention.

At step S501, D2D synchronization signals are received from a first network node. At step S502, A hop number of the D2D synchronization signals is determined based on radio resources of the D2D synchronization signals. At step S503, whether to transmit the D2D synchronization signals to a second network node is determined based on the hop number.

According to embodiments of the present invention, the hop number of the D2D synchronization signals may be determined by obtaining D2DSS/PD2DSCH according to the radio resources of the D2D synchronization signals; and determining the hop number of the D2D synchronization signals based on the D2DSS/PD2DSCH.

According to embodiments of the present invention, whether to transmitting the D2D synchronization signals to a next network node may be determined by comparing the hop number with a predefined maximum hop number; and if the hop number is less than the predefined maximum hop number, determining further radio resources to transmit the D2D synchronization signals to the next network node.

In accordance with embodiments of the present invention, the terms D2DSS and PD2DSCH indicate any form of respectively reference signals and control information that may be exploited, possibly among other purposes, for the synchronization of devices.

Embodiments of the present invention may be combined in any appropriate ways. It is assumed here that both D2DSS and PD2DSCH are transmitted by a synchronization source UE, but embodiments of the present invention may be applied even if only any of them is transmitted. Embodiments of the present invention may be implemented in UEs participating in a D2D communication (as receivers and/or transmitters). Now some exemplary embodiments of the present invention will be described below.

Embodiment 1

In a first example, the radio resources are partitioned such that a number of possibly periodic orthogonal resources are assigned to D2DSS and/or PD2DSCH associated to different hop numbers, such that inter-D2DSS and/or inter-PD2DSCH interference between different hop numbers are avoided. E.g., the different hops may be partitioned in a TDM fashion. Such a solution would allow a UE that is transmitting on hop number n to track the synchronization signals on other hop numbers.

In a further example, a UE that is tracking hop number n scans resources associated to hop numbers not greater than n, and it avoids searching for synchronization sources with hop number greater than n. This is because higher hop numbers reduce priority in the distributed synchronization protocols and complexity/energy can be reduced by focusing on hop numbers of interest.

In a further example, a UE transmitting D2DSS/PD2DSCH associated to a certain hop number periodically or pseudo-randomly or occasionally drops transmission of D2DSS and/or PD2DSCH in order to be able to scan for the presence of other synchronization signals transmitted on overlapping resources.

In a further example, the mapping of D2DSS/PD2DSCH associated to a given hop number and the corresponding resource offset in the subframe are pre-defined according to a specification or assigned by the NW.

Figure 6:
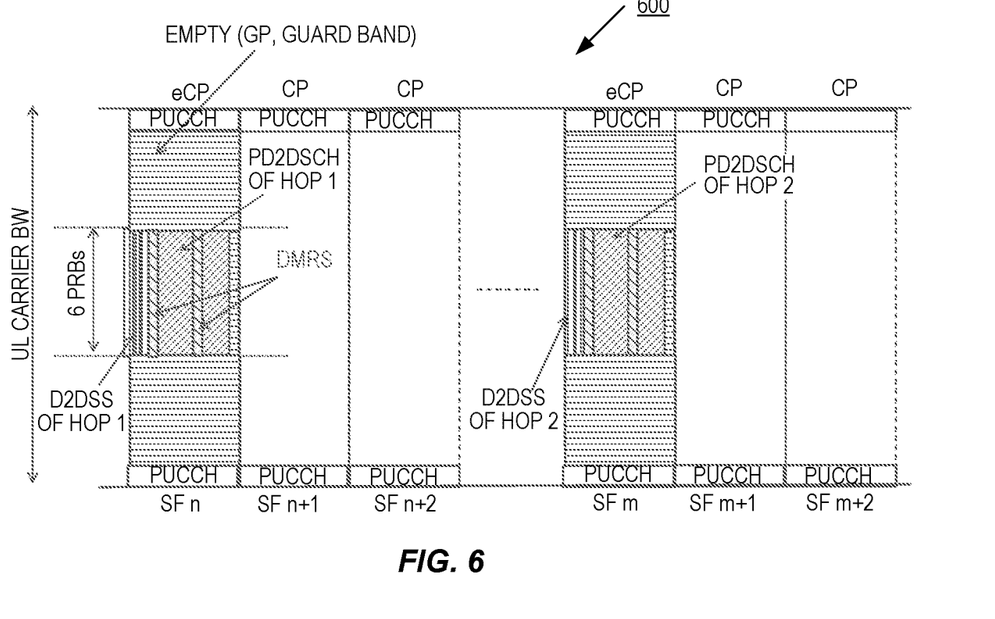
FIG. 6 illustrates a schematic diagram of D2DSS/PD2DSCH mapping according to embodiments of the invention.

Reference is now made to FIG. 6, which illustrates a schematic diagram of D2DSS/PD2DSCH mapping according to embodiments of the invention. In this example, D2DSS and PD2DSCH of the same hop number are TDMed in one subframe (SF). D2DSS/PD2DSCH of different hop number are mapped on different subframe. The subframe offset (n, m in FIG. 6) could be preconfigured or assigned by NW.

Figure 7:
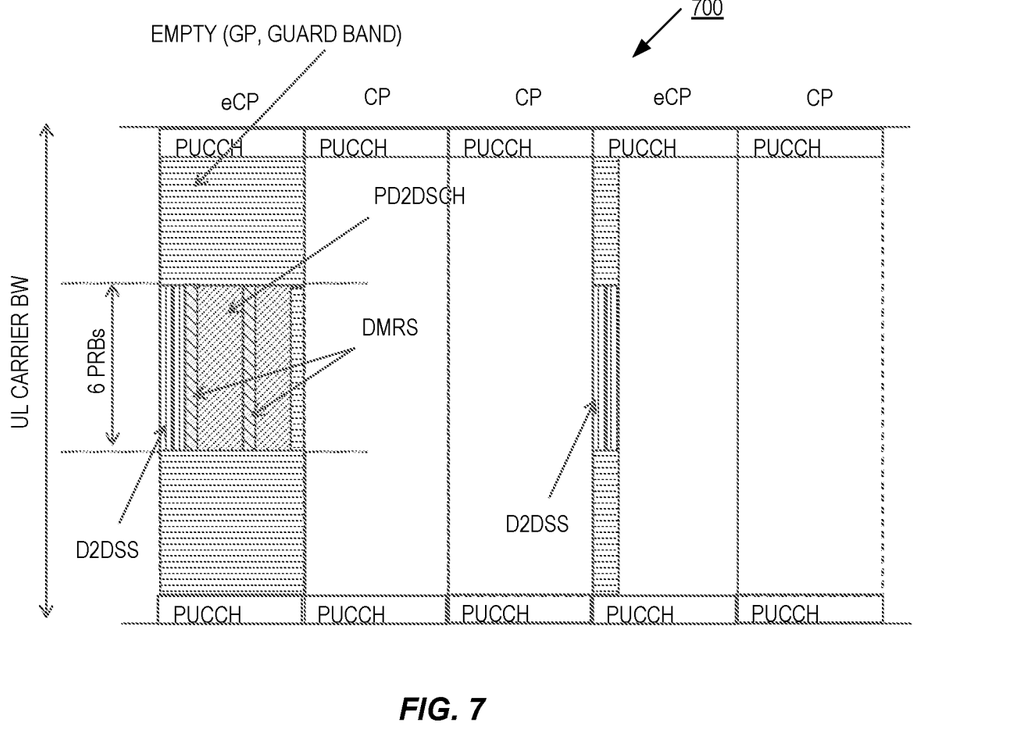
FIG. 7 illustrates a schematic diagram of D2DSS/PD2DSCH mapping according to further embodiments of the invention.

As shown in FIG. 6, in subframe n, D2DSS and PD2DSCH of hop 1 occupy 6 Physical Resource Blocks (PRBs) in the uplink (UL) carrier bandwidth (BW), respectively. Demodulation Reference Signals (DMRSs) exit in PD2DSCH. Besides the 6 PRBs, other PRBs in subframe n are empty, for example GP, guard band, and so on. Also, the last OFDM symbol of this subframe is empty and reserved for GP. In FIGS. 6 and 7, CP is Cyclic Prefix and eCP is extended CP.

In a further example, the relative mapping and relative periodicity of PD2DSCH associated to a certain D2DSS is the same, independently of the associated synchronization hop number. In some embodiments, the period of D2DSS of different hops may be the same, the period of PD2DSCH of different hops may be the same, and periods of D2DSS and PD2DSCH of the same hop may be different.

Embodiment 2

In a further example, D2DSS and/or PD2DSCH carry explicitly or implicitly the associated hop number in the synchronization protocol. This can be done, e.g., by the PD2DSCH payload or the D2DSS sequence or the PD2DSCH and/or D2DSS resource mapping.

A UE receiving a certain synchronization signal associated with the corresponding hop number is thus able to retrieve the frame synchronization (based on the predefined mapping of D2DSS/PD2DSCH to the frame, for each hop number).

Embodiment 3

In a further example, a D2D-capable transmitter UE avoids transmitting any other signal than D2DSS/PD2DSCH on resources reserved for such signals, even if those resources are associated to different synchronization hop numbers than the synchronization reference received and/or transmitted by the UE. The amount of reserved resources is a function of the maximum number of supported synchronization hops.

In a further example, not only the resources potentially used for transmission of a given D2DSS/PD2DSCH transmission are reserved, but even those surrounding them in time and/or frequency domains. For example, a UE avoids using the OFDM symbols where D2DSS and/or PD2DSCH associated to a certain hop number are potentially transmitted (of course the UE may still be able to transmit D2DSS/PD2DSCH associated to its own hop number). In a further example, a subset of OFDM symbols preceding and/or following a D2DSS and/or PD2DSCH potential transmission associated to a given sync hop number are reserved. FIG. 7 illustrates a schematic diagram of D2DSS/PD2DSCH mapping according to embodiments of the invention.

Embodiment 4

In a further embodiment, the NW signals the maximum number of hops supported in the synchronization protocol. Such signal may happen by SIB signaling (broadcast control info) or by UE specific signaling. Different classes of UEs (e.g., Public Safety and Commercial UEs) may be assigned with different sync hops limitations. Furthermore, the maximum number of hops that a certain synchronization reference may be retransmitted may be different depending on the type of the original synchronization source (first hop). For example, synchronization references originally originating from an eNB may be relayed more times than synchronization references originally originated by a UE. The maximum number of hops that a certain synchronization reference may be retransmitted may also be different depending on the NW-coverage status of the sync-relay UE.

According to embodiments of the present invention, the maximum number of hops may be predefined in the synchronization protocol or by the network side (NW).

Figure 8:
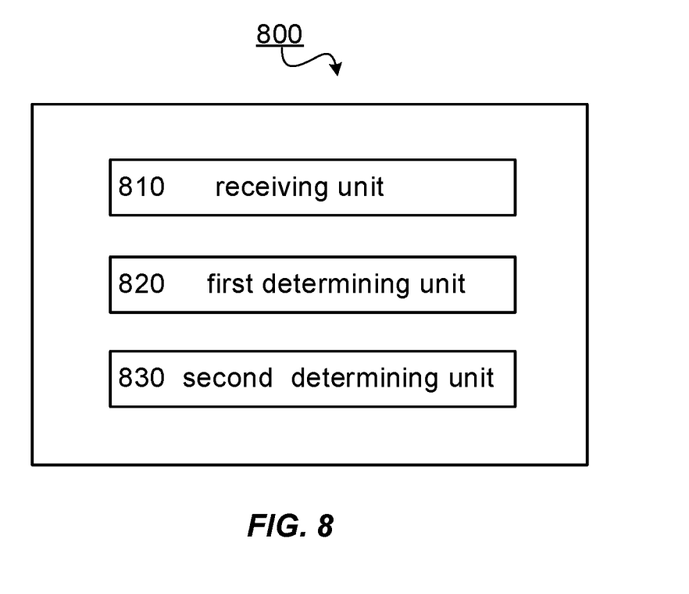
FIG. 8 illustrates a block diagram of an apparatus 800 for transmitting D2D synchronization signals according to embodiments of the invention.

Reference is now made to FIG. 8, which illustrates a block diagram of an apparatus 800 for transmitting D2D synchronization signals according to embodiments of the invention. As shown, the apparatus 800 comprises: a receiving unit 810 configured to receive D2D synchronization signals from a first network node, a first determining unit 820 configured to determine a hop number of the D2D synchronization signals based on radio resources of the D2D synchronization signals, and a second determining unit 830 configured to determine whether to transmit the D2D synchronization signals to a second network node based on the hop number. In accordance with embodiments of the present invention, the apparatus 800 may be implemented at a network node, for example, a UE, a D2D transmitter, a D2D receiver, and some other suitable device.

In accordance with embodiments of the present invention, the first determining unit 820 may comprise: an obtaining unit configured to obtain D2DSS/PD2DSCH according to the radio resources of the D2D synchronization signals; and a third determining unit configured to determine the hop number of the D2D synchronization signals based on the D2DSS/PD2DSCH.

In accordance with embodiments of the present invention, the second determining unit 830 may comprise: a comparing unit configured to compare the hop number with a predefined maximum hop number; and a fourth determining unit configured to, if the hop number is less than the predefined maximum hop number, determine further radio resources to transmit the D2D synchronization signals to the next network node.

Figure 9:
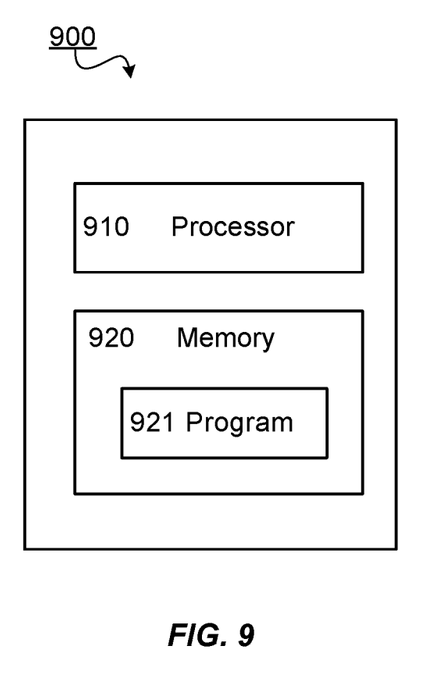
FIG. 9 illustrates a block diagram of an apparatus 900 for transmitting D2D synchronization signals according to embodiments of the invention.

Reference is now made to FIG. 9, which illustrates a block diagram of an apparatus 900 that is suitable for implementing the exemplary embodiments of the invention. The apparatus 900 may comprise at least one processor 910; and at least one memory 920 including compute program instructions 921, wherein the at least one memory 920 and computer program instructions 921 are configured to, with the at least one processor 910, cause the apparatus 900 at least to perform methods according to embodiments of the present invention.

The at least one processor is suitable for use with embodiments of the present disclosure and may include, by way of example, both general and special purpose processors already known or developed in the future. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus to at least perform according to method 500 as discussed above. It is to be noted that although the apparatus 800 or 900 may be included in a network node, the apparatus may be associated with the network node (for example, interfaces with the network node), instead of being a part of the network node.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 5 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit, FPGA or ASIC that is configurable to operate in accordance with the exemplary embodiments of the present invention.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various modifications, adaptations to the foregoing exemplary embodiments of this invention may become apparent to those skilled in the relevant arts in view of the foregoing description, when read in conjunction with the accompanying drawings. Any and all modifications will still fall within the scope of the non-limiting and exemplary embodiments of this invention. Furthermore, other embodiments of the inventions set forth herein will come to mind to one skilled in the art to which these embodiments of the invention pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for transmitting device-to-device (D2D) synchronization signals, the method comprising:
    receiving a D2D synchronization signal from a first network node on a first subframe with a first subframe offset for a first hop number of the D2D synchronization signal;
    determining a second subframe offset for a second hop number of the D2D synchronization signal; and
    transmitting the D2D synchronization signal to a second network node on a second subframe with the second subframe offset.

2. The method of claim 1, further comprising reserving resources for the transmission of the D2D synchronization signal and not transmitting any signal other than the D2D synchronization signal on the reserved resources.

3. The method of claim 1, further comprising periodically, pseudo-randomly or occasionally dropping the transmission of D2D synchronization signals received from the first network node.

4. The method of claim 3, further comprising performing a scan for the presence of other synchronization signals when periodically, pseudo-randomly or occasionally dropping the transmission of D2D synchronization signals received from the first network node.

5. An apparatus for transmitting device-to-device (D2D) synchronization signals, the apparatus comprising:
    a receiving unit configured to receive a D2D synchronization signal from a first network node on a first subframe with a first subframe offset for a first hop number of the D2D synchronization signal;
    a determining unit configured to determine a second subframe offset for a second hop number of the D2D synchronization signal; and
    a transmitting unit configured to transmit the D2D synchronization signal to a second network node on a second subframe with the second subframe offset.

6. The apparatus of claim 5, wherein the determining unit is further configured to reserve resources for the transmission of the D2D synchronization signal and not transmit, via the transmitting unit, any signal other than the D2D synchronization signal on the reserved resources.

7. The apparatus of claim 5, wherein the determining unit is further configured to periodically, pseudo-randomly or occasionally drop the transmission of D2D synchronization signals received from the first network node.

8. The apparatus of claim 7, wherein the determining unit is further configured to perform a scan for the presence of other synchronization signals when periodically, pseudo-randomly or occasionally dropping the transmission of D2D synchronization signals received from the first network node.

9. A network node, comprising the apparatus according to claim 5.

10. An apparatus for transmitting device-to-device (D2D) synchronization signals, the apparatus comprising:
    at least one processor; and
    at least one memory including computer program instructions,
    wherein the at least one memory and computer program instructions are configured to, with the at least one processor, cause the apparatus to:
        receive, via a receiver of the apparatus, a D2D synchronization signal from a first network node on a first subframe with a first subframe offset for a first hop number of the D2D synchronization signal;
        determine a second subframe offset for a second hop number of the D2D synchronization signal; and
        transmit, via a transmitter of the apparatus, the D2D synchronization signal to a second network node on a second subframe with the second subframe offset.

11. The apparatus of claim 10, wherein the at least one memory and computer program instructions are further configured to, with the at least one processor, cause the apparatus to reserve resources for the transmission of the D2D synchronization signal and not transmit any signal other than the D2D synchronization signal on the reserved resources.

12. The apparatus of claim 10, wherein the at least one memory and computer program instructions are further configured to, with the at least one processor, cause the apparatus to periodically, pseudo-randomly or occasionally drop the transmission of D2D synchronization signals received from the first network node.

13. The apparatus of claim 12, wherein the at least one memory and computer program instructions are further configured to, with the at least one processor, cause the apparatus to perform a scan for the presence of other synchronization signals when periodically, pseudo-randomly or occasionally dropping the transmission of D2D synchronization signals received from the first network node.

* * * * *